May 1, 1951     F. B. QUINLAN     2,551,289
PNEUMATIC VIBRATING MACHINE
Filed Jan. 21, 1948
Fig.1.
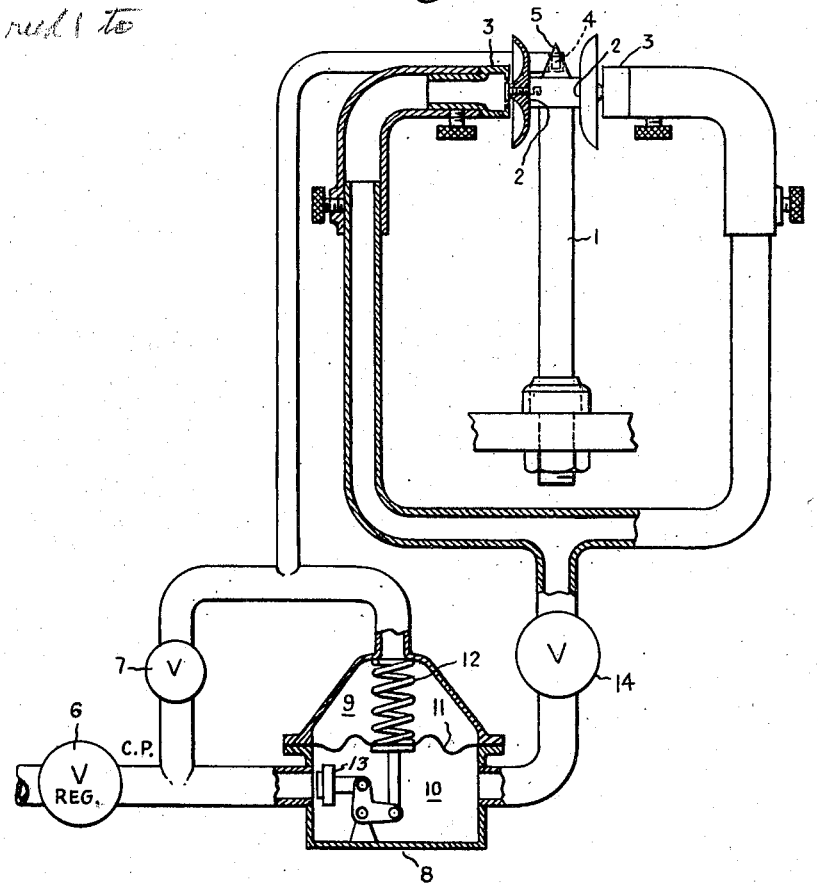
Fig.2.
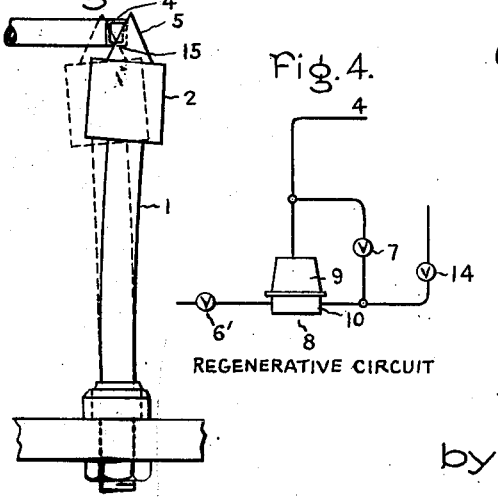
Fig.3.
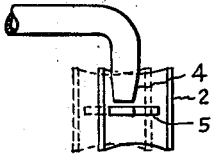
Fig.4.
REGENERATIVE CIRCUIT
Inventor:
Frank B. Quinlan,
by Crowell & Mack
His Attorney.

Patented May 1, 1951

2,551,289

UNITED STATES PATENT OFFICE 2,551,289

PNEUMATIC VIBRATING MACHINE

Frank B. Quinlan, Richland, Wash., assignor to General Electric Company, a corporation of New York Application January 21, 1948, Serial No. 3,598

6 Claims. (Cl. 73—67)

1

My invention relates to improvements in pneumatic vibrators, and more particularly to vibrating reed machines of the type disclosed in my copending patent application Serial No. 673,081, filed May 29, 1946, and assigned to the same assignee as the present application.

In machines of the above type, it is in most cases very desirable that the vibrational amplitude be maintained constant. Such amplitude will be constant if the stiffness and internal friction of the vibrating reed and the air pressure all remain constant; however, these ideal conditions are seldom realized in practice. For example, in fatigue testing machines where the material tested forms the vibrating reed, which is an important use of such apparatus, the stiffness and internal friction of the reed change as the material begins to fail, so that the amplitude of vibration does not remain constant until failure is complete unless some amplitude control method is employed.

It is an object of the present invention to provide a simple, reliable method of maintaining the vibrational amplitude of such a machine constant.

The features of my invention which are believed to be novel and patentable are pointed out in the claims appended hereto. For a better understanding of my invention, reference is made in the following description to the accompanying drawing in which Fig. 1 is a schematic diagram of apparatus embodying my invention; Fig. 2 is an elevation of a part of such apparatus; Fig. 3 is a plan view of the same part shown in Fig. 2; and Fig. 4 is a fragmentary schematic diagram showing a modification of the apparatus of Fig. 1.

Referring now to Fig. 1, reed 1 which is to be vibrated has at one end thereof a piston 2 having two opposite faces adjacent to openings in two air cylinders 3. In operation, compressed air is expelled from the ends of cylinders 3 in such a manner as to apply a force alternately to opposite faces of piston 2. This vibrates the piston and the end of reed 1 to which it is attached at a frequency depending upon the stiffness and length of the reed and the weight of the vibrating parts. Generally, reed 1 begins to vibrate automatically as soon as air pressure is applied, since initial air flow through the two openings is not likely to be absolutely symmetrical. If such vibrations do not being automatically, they can be started by plucking reed 1.

In order to control the vibrational amplitude, I provide a gas escape port 4 and a triangular portion 5 attached to piston 2, as shown, and in obstructing relationship with port 4. When the reed is in its center or non-vibrating position, portion 5 is in its maximum obstructing position with relation to port 4, and when reed 1 and the attached piston 2 are vibrated in either direction away from such center position, the obstruction of port 4 by portion 5 is decreased. This may be more easily understood by referring to Figs. 2 and 3. In these figures, the solid lines show the vibrating parts in position to the right of center and the broken lines show the same parts at a position one-half cycle later to the left of center. It is evident that the area of port 4 which is exposed by such vibrations is related to the vibrational amplitude. This is partly because of the triangular shape of portion 5 whereby the point of intersection 15 is lowered as the amplitude of vibration increases, and partly due to the fact that with increased vibrational amplitude the speed of portion 5 is passing through center position is increased, whereby the time that the portion 5 is in its maximum obstructing position is reduced.

Referring again to Fig. 1, a regulating valve 6 is connected to a source of compressed air or other gas, and is adapted to supply to the pipe immediately to the right of the valve compressed gas at a constant pressure. A throttle valve 7 and connecting pipes as shown are arranged to conduct a portion of this gas to escape port 4.

A differential pressure regulating valve 8 has an upper chamber 9 and a lower chamber 10 separated by a pressure sensitive diaphragm 11. Since the pressure in chamber 9 is usually less than the pressure in chamber 10, as will be hereinafter explained, a spring 12 is added to apply an additional pressure to the upper side of diaphragm 11 so that the forces above and below the diaphragm will normally be in balance. Valve mechanism 13 is responsive to movements of diaphragm 11 and is adapted to control the flow of gas into chamber 10 from the constant pressure side of valve 6. Gas conducting means, such as pipes, connect chamber 10 to throttle valve 14, which is the inlet valve of the pneumatic vibrator. Other gas conducting means connect chamber 9 to the escape port 4.

To operate my apparatus, valve 7 is at first closed and valve 14 is opened until reed 1 vibrates at about one-half the desired amplitude. Valve 7 is then opened until the desired vibrational amplitude is obtained. This opening of valve 7 increases the pressure in chamber 9 and results in the further opening of the valve at 13. Now if the vibrational amplitude increases, the obstruction of port 4 by portion 5 will decrease, which will allow more gas to escape through port 4 and thereby reduce the pressure in chamber 9. This will increase the pressure difference between chambers 9 and 10, thereby causing valve mechanism 13 to admit less gas to chamber 10 until the proper pressure relationship between the two chambers is restored. The lowered pressure in chamber 10 will then reduce the amount of gas flowing through valve 14 which, in turn, will reduce the amplitude of vibration of reed 1. In a similar manner, if the vibrational amplitude decreases below the desired value, the pressure in chamber 9 will increase and that in chamber 10 will also rise which will tend to increase the amplitude of vibration. In this way, the vibrational amplitude is held at a substantially constant value at all times.

In Fig. 4 I have shown a modification which provides a regenerative circuit to produce a more rigid and positive restoring force to the vibrating member. Decreasing amplitude of the vibrated reed increases the pressure at port 4 as hereinbefore explained. This, in turn, increases the pressure in upper chamber 9 and therefore, in lower chamber 10, and results not only in increasing pressure at valve 14 but also at valve 7. This gives an added pressure increase in chamber 9, thus providing regeneration to more quickly correct any amplitude errors. It is evident that increasing amplitude initiates a similar cycle which causes a regenerative decrease in pressure in chamber 9. In this modification it is not essential that a constant-pressure gas source be provided; therefore, valve 6' may be simple on-off valve or a throttle valve, or may be a constant-pressure valve similar to valve 6 hereinbefore described.

In accordance with the provisions of the patent statutes, I have described the principle of my invention, together with the apparatus which I now consider to represent the best embodiment thereof; but I wish it to be understood that the apparatus described is illustrative only, and that the invention can be carried out by other means.

What I claim as new and desire to secure by Letters Patent of the United States is:

1. In combination, a pneumatic vibrator, a gas escape port, a member vibrated by said vibrator and in obstructing relationship with said port such that the degree of obstruction varies with changes in its vibrational amplitude, means to provide a flow of gas through said escape port when it is not obstructed, and means to vary the rate of flow of gas to the vibrator responsive to variations in the rate of flow through the escape port.

2. In combination, a pneumatic vibrator and vibrational amplitude regulating apparatus therefor comprising a gas escape port, a member vibrated by said vibrator and having a portion of non-uniform width in obstructing relationship with said port such that the degree of obstruction is inversely related to its vibrational amplitude, means to provide a flow of gas through said escape port when it is not obstructed, and means to vary the rate of flow of gas to the vibrator responsive to variations in the rate of flow through the escape port.

3. In combination, a pneumatic vibrator and vibrational amplitude regulating apparatus therefor comprising a gas escape port, a member vibrated by said vibrator and in obstructing relationship with said port such that the degree of obstruction varies with changes in its vibrational amplitude, means to provide a flow of gas through said escape port when it is not obstructed, and means including a differential gas pressure regulating valve to vary the rate of flow of gas to the vibrator responsive to variations in the rate of flow through the escape port.

4. In combination, a pneumatic vibrator, a gas escape port, a member vibrated by said vibrator and having a portion of non-uniform width in obstructing relationship with said port such that maximum obstruction occurs when said member is in its center or non-vibrating position and less obstruction occurs when said member is vibrated to either side of such position, means to provide a flow of gas through said escape port when it is not obstructed, a differential gas pressure regulating valve having an upper chamber and a lower chamber separated by a pressure-responsive diaphragm, gas conducting means connecting the upper chamber to the escape port and the lower chamber to the vibrator, and means responsive to movement of said diaphragm for admitting gas to the lower chamber of sufficient amount to maintain a constant pressure difference between said upper and lower chambers.

5. In combination, a pneumatic vibrator, a gas escape port, a member vibrated by said vibrator and having a triangular portion in obstructing relationship with said port such that maximum obstruction occurs when said member is in its center or non-vibrating position and less obstruction occurs when said member is vibrated to either side of such position, a constant-pressure gas supply, connections including a valve for conducting a portion of such gas to the gas escape port, a differential gas pressure regulating valve having an upper chamber and a lower chamber separated by a pressure-responsive diaphragm and including mechanism responsive to movements of the diaphragm to control a flow of gas into the lower chamber, gas-conducting means operatively connecting the gas supply, the lower chamber, and the pneumatic vibrator, and gas-conducting means connecting the upper chamber and the gas escape port.

6. In combination, a pneumatic vibrator, a gas escape port, a member vibrated by said vibrator and in obstructing relationship with said port such that the degree of obstruction is inversely related to its vibrational amplitude, a differential gas pressure regulating valve having an upper chamber and a lower chamber separated by a pressure-responsive diaphragm, said lower chamber having gas inlet and outlet ports, a compressed gas supply connected to said inlet, mechanism responsive to movements of said pressure-responsive diaphragm to control the flow of gas through said inlet, gas-conducting means connecting said outlet to the pneumatic vibrator, connections including a throttle valve connecting said outlet to said upper chamber, and gas conducting means connecting the upper chamber and the gas escape port.

FRANK B. QUINLAN.

REFERENCES CITED

The following references are of record in the file of this patent:

UNITED STATES PATENTS

| Number | Name | Date |
|---|---|---|
| 2,111,036 | Wippel | Mar. 15, 1938 |
| 2,354,431 | Bosomworth | July 25, 1944 |

FOREIGN PATENTS

| Number | Country | Date |
|---|---|---|
| 575,917 | Great Britain | Mar. 11, 1946 |